US010237723B2

(12) United States Patent
Borse

(10) Patent No.: US 10,237,723 B2
(45) Date of Patent: Mar. 19, 2019

(54) MANAGING MULTIPLE ACTIVE SUBSCRIBER IDENTITY MODULE PROFILES

(71) Applicant: Giesecke & Devrient Mobile Security America, Inc., Dulles, VA (US)

(72) Inventor: Hemant Borse, Ashburn, VA (US)

(73) Assignee: Giesecke+Devrient Mobile Security America, Inc., Dulles, VA (US)

( * ) Notice: Subject to any disclaimer, the term of this patent is extended or adjusted under 35 U.S.C. 154(b) by 0 days.

(21) Appl. No.: 15/305,692

(22) PCT Filed: Jun. 13, 2016

(86) PCT No.: PCT/US2016/037138
§ 371 (c)(1),
(2) Date: Oct. 21, 2016

(87) PCT Pub. No.: WO2016/201398
PCT Pub. Date: Dec. 15, 2016

(65) Prior Publication Data
US 2017/0164184 A1   Jun. 8, 2017

Related U.S. Application Data

(60) Provisional application No. 62/174,380, filed on Jun. 11, 2015.

(51) Int. Cl.
H04W 88/06 (2009.01)
H04W 8/18 (2009.01)
(Continued)

(52) U.S. Cl.
CPC .......... H04W 8/183 (2013.01); H04B 1/3816 (2013.01); H04L 29/08 (2013.01);
(Continued)

(58) Field of Classification Search
CPC ..................................................... H04W 8/183
See application file for complete search history.

(56) References Cited

U.S. PATENT DOCUMENTS 9,119,173 B1*  8/2015  Krishnamoorthy ... H04W 68/02
2011/0217969 A1*  9/2011  Spartz ................... H04W 36/14
                                                             455/422.1
(Continued)

FOREIGN PATENT DOCUMENTS

WO   2013-066077 A1   5/2013
WO   2014-077544 A1   5/2014

OTHER PUBLICATIONS

Korean Intellectual Property Office (ISA), International Search Report and Written Opinion for International Application No. PCT/US2016/037138, dated Sep. 23, 2016.
(Continued)

Primary Examiner — Mazda Sabouri
(74) Attorney, Agent, or Firm — Drinker Biddle & Reath LLP

(57) ABSTRACT

A method and system performing the method includes receiving a request to activate an additional profile in a subscriber identity module that comprises at least one active profile associated with a first basic logical channel. The additional profile is in an inactive state. The method also includes requesting, using the first basic logical channel, the subscriber identity module to associate the additional profile with a second basic logical channel for communicating with the first profile. The method further includes transmitting a command to the additional profile using the second basic logical channel while the at least one active profile associated with the first basic logical channel is in an active state.

19 Claims, 5 Drawing Sheets

(51) Int. Cl.
  *H04L 29/08* (2006.01)
  *H04W 12/06* (2009.01)
  *H04W 76/15* (2018.01)
  *H04B 1/3816* (2015.01)

(52) U.S. Cl.
  CPC ........... *H04L 67/306* (2013.01); *H04W 12/06* (2013.01); *H04W 76/15* (2018.02); *H04W 88/06* (2013.01)

(56) References Cited

U.S. PATENT DOCUMENTS

| | | | |
|---|---|---|---|
| 2013/0023309 A1 | 1/2013 | Holtmanns et al. | |
| 2013/0310003 A1* | 11/2013 | Sadhvani | H04W 12/06 455/411 |
| 2014/0228071 A1* | 8/2014 | Villarrubia Grande | H04M 1/72519 455/552.1 |
| 2014/0287725 A1 | 9/2014 | Lee | |
| 2014/0349617 A1 | 11/2014 | Li et al. | |
| 2014/0349633 A1* | 11/2014 | Sajadieh | H04W 8/18 455/418 |
| 2015/0094071 A1* | 4/2015 | Hang | H04W 76/028 455/450 |
| 2016/0309324 A1* | 10/2016 | Praca | H04L 63/0853 |
| 2016/0323933 A1* | 11/2016 | Song | H04W 88/06 |

OTHER PUBLICATIONS

International Bureau of WIPO, International Preliminary Report on Patentability for International Application No. PCT/US2016/037138, dated Dec. 21, 2017.

\* cited by examiner

MANAGING MULTIPLE ACTIVE SUBSCRIBER IDENTITY MODULE PROFILES

CROSS REFERENCE TO RELATED APPLICATIONS

This application is the National Stage of International Application No. PCT/US2016/037138, filed Jun. 13, 2016, and claims priority to U.S. Provisional Patent Application Ser. No. 62/174,380, filed Jun. 11, 2015, which is incorporated by reference herein in its entirety for all purposes.

TECHNICAL FIELD

The present disclosure relates generally to subscriber identity module profiles, and more specifically to managing multiple active SIM profiles.

BACKGROUND

Wireless communication networks provide various communication services such as telephony, video, data, messaging, and broadcasts. Such networks support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology. The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS supports enhanced 3G data communications protocols, such as High Speed Packet Access (HSPA), which provides greater data transfer speeds and capacity to associated UMTS networks. Other example networks include GPRS/EDGE, CDMA/DO, or EUTRAN (4G LTE). Such wireless communication networks may follow standards implemented by the European Telecommunications Standards Institute (ETSI) or the Third Generation Partnership Project (3GPP), for example.

Contemporary wireless devices frequently include a subscriber identity module (SIM) card to facilitate communication with a communication network via a subscription for the designated voice or data subscription of the wireless device. SIM cards include information and provide identity documentation, authentication, and other information regarding a user of the wireless device via an embedded integrated circuit component. The integrated circuit component securely stores an international mobile subscriber identity (IMSI) with a key that is used to identify and authenticate subscribers on connected mobile devices, such as cell phones, tablets, and computers. Various other information may also be stored on the SIM card, such as an address book, text messages, network names, or other carrier or subscriber information. This information may also be read from the SIM card and be made available to the wireless device.

SIM cards can additionally contain embedded commands that define how the device should interact with carriers, such as via cellular data requests or voice calls. The commands also provide an interface for interacting with the host device, such as by displaying menus or prompting a user for input. These commands are implemented independently of any associated device or network, thus enabling a decoupled interactive exchange between a network application and host device or end user. Certain commands form a standard toolkit, such as the SIM Application Toolkit ("STK"), which is a standard of the GSM system. In more sophisticated SIM cards, the STK is a Dynamic SIM Toolkit ("DSTK") and the STK interpreter is a DSTK interpreter. Toolkit commands are often generally referred to as "proactive commands."

Service providers often generate content corresponding to a message that is to be sent to a user. Such messages are often written in a markup language (for example, Wireless Internet Gateway Wireless Markup Language ("WIG WML"), SIM @lliance Toolbox Markup Language ("S@TML"), Java Markup Language ("JavaML")). The content is sent to a gateway, which prepares the message and forwards the message to the user. This gateway is known as the Universal Gateway ("UG"). The message includes an instruction, which itself is a SIM card application (for example, a wiblet, a s@tlet, a Java applet) that is received by a portable device belonging to the user. The portable device contains a SIM card including its own memory, which stores a DSTK. Properly programmed, the SIM card functions as a DSTK interpreter, which is configured to interpret the instruction contained in the message. Depending on whether the instruction comprises a wiblet, a s@tlet, or a Java applet, the DSTK interpreter functions as SmartTrust Wib ("Wib"), a SIM @lliance Toolbox ("S@T") interpreter, or a Java interpreter, respectively. The DSTK interpreter interprets the instructions to implement actions or commands included in the DSTK. Some of these commands operate independently of the portable device, and other commands are directed to the portable device, such as a command to display a string of text or ask the user for an input.

Traditionally, SIM cards contained a single subscriber identity profile containing subscription information for a single user subscription plan for a single carrier. A user wishing to communicate via different carriers or networks or switch between wireless subscriptions on a single device could only do so by replacing a SIM card with a corresponding SIM card for the desired subscription plan. Recently, however, SIM cards are being designed to accommodate multiple operator profiles on a single SIM card. These cards are designed with a container for each operator profile with a dedicated set of commands (e.g., toolkit) for interoperating between the carrier and device.

A profile container is an object containing a complete universal integrated circuit card ("UICC") file system. The profile in use is generally described as the active profile. The active profile is generally assigned the basic logical channel, which is often logical channel 00. In existing implementations, only a single profile can be active at one time. These implementations switch between active profiles on a device via a local device proxy profile switching mechanism or by a server initiated instruction. Switching active profiles includes, among other things, reassigning basic logical channel 00 to the new active profile. However, it may be advantageous to accommodate multiple active profiles simultaneously without switching from one active profile to another.

SUMMARY OF THE INVENTION

According to aspects of the present disclosure, a method includes receiving a request to activate a first profile in a subscriber identity module embedded in a mobile device. The first profile is in an inactive state. The subscriber identity module includes at least one active profile associated with a first basic logical channel. The method further includes requesting, using the first basic logical channel, the subscriber identity module to associate the first profile with a second basic logical channel for communicating with the first profile. The method additionally includes activating the first profile using the second basic logical channel.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

Removable SIM technology has set the standard for the development of mobile telephony subscriber identity management techniques over the past 25 years. SIM cards allow mobile network operators to authenticate a subscriber using a secure token that is stored in an integrated circuit (IC) on a small and inexpensive card that can be easily distributed to subscribers. SIM cards also provide subscribers with a means for preserving their identity and other personal information across devices or while upgrading handset technology. SIM cards additionally allow device manufacturers to market a single device to different markets around the world by providing a mechanism for abstracting subscriber and carrier information from the device itself. Use of SIM technology is nearly universal in mobile networks across the world.

Traditionally, each SIM card contained subscriber identity and subscription information for a single subscription plan on a single carrier. However, more recently, technological advancements and user demand for more flexibility have resulted in development of SIM cards with multiple subscriber profiles and/or multiple operator profiles on a single SIM, allowing a user or carrier to manually switch between active profiles without replacing the SIM card.

Figure 1:
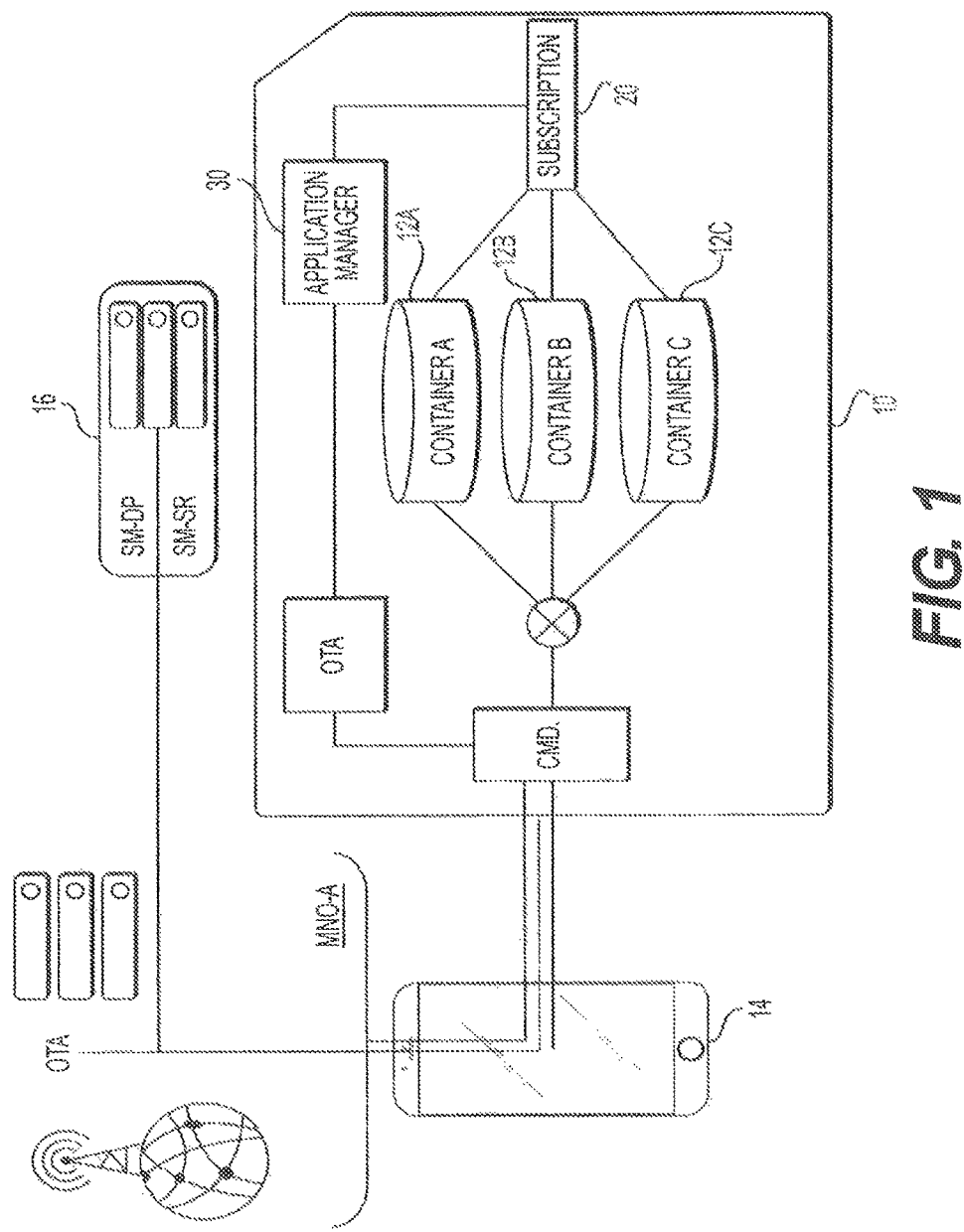
FIG. 1 illustrates a high level block diagram of a system for managing multiple active subscriber identity module profiles in accordance with a particular non-limiting embodiment of the present disclosure.

In the multi-profile solution, each set of subscriber and operator profile information is stored in a dedicated container with its own complete UICC file system including the master file ("MF") level in the file system. For example, as referenced in FIG. 1, a single SIM 10 may have three profile containers 12a-c, with only one being active at a time. The active profile can be switched locally by a user of device 14 or remotely over the air by server 16. In FIG. 1, container profile 12a is active. SIM 10 can be implemented as a removable SIM card or as an onboard device such as an eSIM.

Customers of wireless network operators can have multiple subscriptions with the same carrier. For example, one subscriber has a pre-paid cellular voice plan and a post-paid cellular data plan. Such a subscription configuration allows the user to use voice over internet protocol ("VoIP") applications to make voice calls on his or her post-paid cellular data plan when a data connection is available, while only utilizing the pre-paid voice subscription when no data connection is available. As another example, a user has a family, work, or group data plan with unlimited international data usage to share with other subscribers, and additionally has several personal subscriptions for voice calls in various regions or coverage areas. In these examples, each subscription plan can be managed on a single SIM with separate subscriber profile containers.

However, wireless network operators who wish to service customers with multiple subscriptions may be unable to effectively or efficiently do so using current multi-profile management techniques. Many use cases require instantaneous switching or simultaneous activation of several subscription profiles in order to service user demands. For example, current SIM profile management techniques are unable to accommodate the scenario in which a user with separate voice and data subscriptions wishes to load a webpage using a data subscription while making voice calls using a separate voice subscription because only a single subscriber profile can be active at one time.

Further, users who wish to maximize the cost-efficiency of their cellular usage through intelligent and dynamic activation and usage of various subscription plans may be unable to do so. For example, a user may shop around for the lowest cost voice plan and a lowest cost data plan. These plans may be offered by competing carriers. The user's device may contain an application that dynamically determines the most cost-efficient and effective cellular or non-cellular protocol for transmitting and receiving communications. For example, the application may determine which subscription plan has the best reception for the particular type of communication. However, the application may be unable to efficiently determine reception levels between subscription networks for comparison and selection of the best subscription plan because only one subscription profile can be active.

The teachings of the present disclosure describe techniques for enabling simultaneous operation of multiple subscription profiles on a single SIM, managing communications by and through multiple active subscription profiles, and selection of an active profile for handling communications. The teachings of the present disclosure propose selecting each profile by container identifier and dynamically assigning logical channels for use by each active profile.

In certain implementations, multiple containers or profiles are active at the same time. With reference to FIG. 1, containers 12a-c can be made active. Subscription manager 20 handles maintenance of multiple network authentication agreements ("NAA's").

Each profile container 12a-c contains a file system with a toolkit for issuing and processing commands and memory for executing applications. Each application has an identifier that is used when communicating between the application and one or more of the device or the carrier network. However, when two active profiles execute the same application, the application identifiers for the two applications will be the same. This can cause "collisions" when processes (e.g., device processes or server-side processes) attempt to access an application identifier with two active application instances.

Application manager 30 manages the same or similar applications executing in the respective memory spaces of the different active profiles and prevents "collisions" as described above when calling processes attempt to issue commands to or otherwise communicate with these applications. Application manager 30, or some other profile management process or scheme, assigns each profile container a unique identifier. For example, a first profile container has the following unique identifier:

A0 00 00 05 59 10 10 FF FF FF FF 89 00 00 01 00

A second profile container has, for example, the following unique identifier:

A0 00 00 05 59 10 10 FF FF FF FF 89 00 00 11 00

In particular embodiments, the terminal or device, or some process running on the terminal or device (e.g., application manager 30) selects a profile container and selects the application. The terminal requests, for example, through a command Application protocol data unit ("APDU"), the SIM's UICC to assign the current logical channel as a basic logical channel. The basic logical channel can be a toolkit logical channel. A typical SIM may have 20 logical channels (e.g., logical channels 00-19). For example, the current logical channel is logical channel 00, while other channels are supplemental channels carrying data. However, if the logical channel 00 is already assigned (i.e., as a basic logical channel for a different active profile) to a container, the logical channel assigned as the basic logical channel for another container may be any other logical channel. For example, if basic logical channel 00 is assigned to container 12a, then the basic logical channel assigned to container 12b may be logical channel 03. An example command APDU sent by the reader to the card is:

00 71 00 00 00

At startup, the terminal or device generally selects a first active profile. For selection of a second active profile, the terminal issues a manage channel command to the UICC. For example, a profile handler process may run in the UICC for the SIM. The UICC assigns the next available channel for the second active profile. In certain embodiments, the profile handler assesses each available channel and selects the most appropriate channel for the active profile. For didactic purposes, assume this is channel 03. A response APDU is issued to the terminal notifying the terminal that channel 03 was assigned to the second active profile.

The terminal selects the corresponding profile container for second active profile on channel 03 and sends a command APDU to assign that channel as the basic logical channel for the second active profile. The UICC sends a response APDU notifying the terminal that channel 03 has been reserved as the basic logical channel for the second active profile.

The above described process can be repeated for additional profiles, and there is no upper limit of active or inactive profiles. For example, SIM's may have memory space for any number of active profiles and devices may accommodate any number of channels. The teachings of the present disclosure contemplate accommodation of a varying number of active or inactive profiles depending on the SIM and mobile device.

Figure 2:
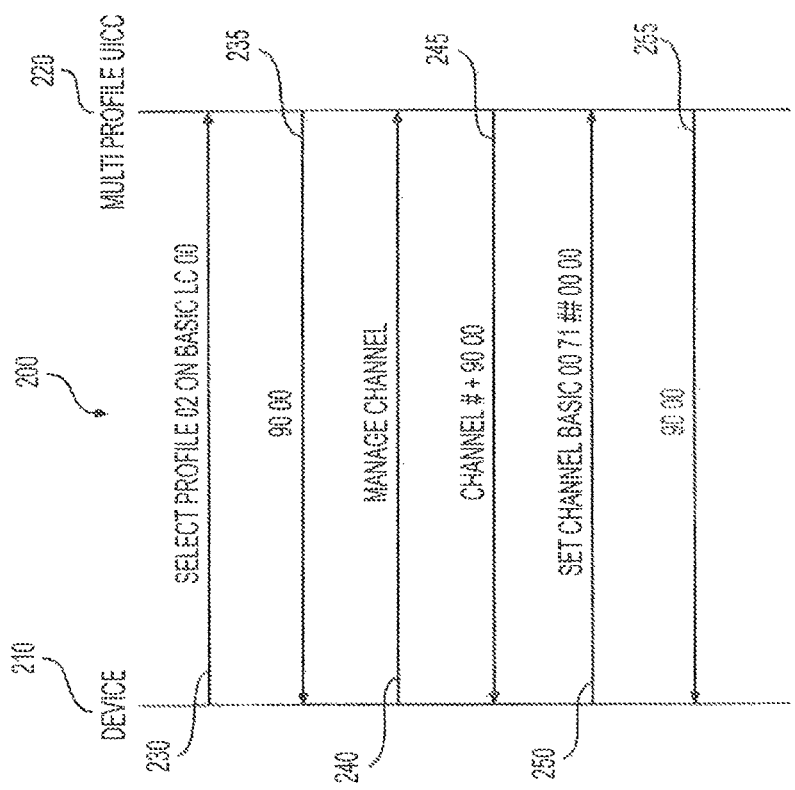
FIG. 2 illustrates a flow chart of a method for managing multiple active subscriber identity module profiles in accordance with a particular non-limiting embodiment of the present disclosure.
Figure 3:
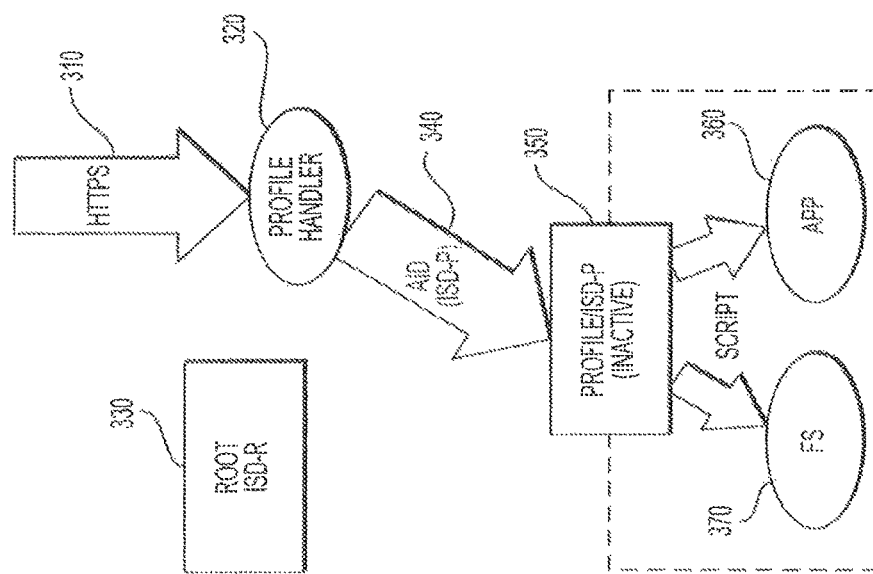
FIG. 3 illustrates a high level block diagram of a system for managing multiple active subscriber identity module profiles in accordance with a particular non-limiting embodiment of the present disclosure.

With reference to FIG. 2, a sequence diagram 200 for managing multiple active SIM profiles at the device level is illustrated in accordance with a non-limiting embodiment of the present disclosure. Sequence diagram 200 includes two actors, namely device 210 and multi-profile UICC 220. UICC 220 is running on a SIM card embedded within device 210. The horizontal lines illustrate APDU commands and responses between device 210 and embedded UICC 220.

At step 230, device 210 issues a command APDU to select a second active profile on basic logical channel 00. If selection of the second profile is successful, UICC 220 issues a response ADPU to confirm successful selection of the second active profile on basic logical channel 00. At step 240, device 210 issues a manage channel command APDU to the selected profile on logical channel 00, which in this instance is the second active profile. At step 245, the UICC assigns a new logical channel, for example, logic channel 03, to the second active profile and sends the corresponding response APDU to device 210. At step 250, device 210 sends a set channel basic command APDU to UICC 220. The UICC checks if the current selected profile (i.e., the second active profile) has a basic logical channel assigned to it. If not, the UICC assigns the assigned channel as the basic logical channel for the second active profile. and sends a corresponding response APDU at step 255. Future toolkit sessions related to the second active profile will occur on the new basic channel.

Incoming traffic is also managed and directed to the proper active profile on the correct channel. For example, incoming push short message service ("SMS") messages are often received on logical channel 00. However, such a configuration can cause a conflict when a second active profile is configured to use a different logical channel as the basic logical channel, such as channel 03 or the like. In particular embodiments, SMS traffic is pushed to a handler process, such as a profile handler, on the device. The handler process may receive all incoming traffic, such as over the air traffic, received at a device, select a particular active profile and channel, and route the traffic to the appropriate profile. Because incoming traffic is merely redirected to the appropriate active profile by the handler process, no server-side changes are required in implementing the teachings of the present disclosure to specify an active profile or container. Accordingly, the teachings of the present disclosure are readily implemented in existing wireless networks without substantial configuration changes to network operator servers.

In particular embodiments, a profile handler receives incoming traffic and an administrative agent opens the channel corresponding to the application identifier or profile container identifier. The profile handler and/or the administrative agent maps the active profile to the application identifier in the incoming traffic and passes the command to the appropriate profile over the mapped channel.

Additionally or alternatively, the incoming traffic may contain a script that administers the components inside the profile. For example, traffic handlers, such as the profile handler discussed above, receives a message via a hyper-text transfer protocol ("HTTP") message or an encrypted HTTP ("HTTPS") connection. The message addresses an inactive profile and contains a script for administering SIM functions within the inactive profile, such as file system operations and application commands. For example, an HTTPS message can include the following:

```
AID (X-Admin-Targeted-Application) Content-Type:
application/vnd.globalplatform.card-content-mgt;
version=1.0 (RAM, acc. GP Amendment B)
application/vnd.etsi.scp.commanddata;
version=1.0 (RFM, acc. ETSI 102 226)
```

The terms "active state" and "inactive state" as applied to subscriber identity module profiles refers to the capacity for the profiles to receive and execute commands, run applications, and/or receive and transmit communications. Profiles in an active state are generally associated with a basic logical channel for receiving and transmitting communications, commands, and the like. A portion of these operations are often referred to as STK operations or toolkit operations. Other operations include transmitting and/or receiving data to/from a carrier server, such as SMS messages and voice call data. The present disclosure contemplates accommodating any functionality associated with SIM profiles for multiple active profiles. In one example, an active profile receives and responds to command APDU's.

Management of multiple active SIM profiles includes managing multiple network authentication agreements with various carriers or network operators. For example, a SIM card includes subscription profiles for mobile network connectivity with various network providers. Each subscription profile has a network authentication agreement that specifies security protocols for communicating with the network. If two or more profiles are active, the system manages multiple network authentication agreement protocols to ensure messages are sent and received according to the protocol specified by the network authentication agreement for the profile.

Traditional profile management techniques often allocate only one logical channel for command APDU, STK, or other SIM operations. Such a configuration can be specified by an industry standard. For example, in traditional systems, only basic logical channel 00 is used to transmit certain STK commands to an active SIM profile.

Figure 4:
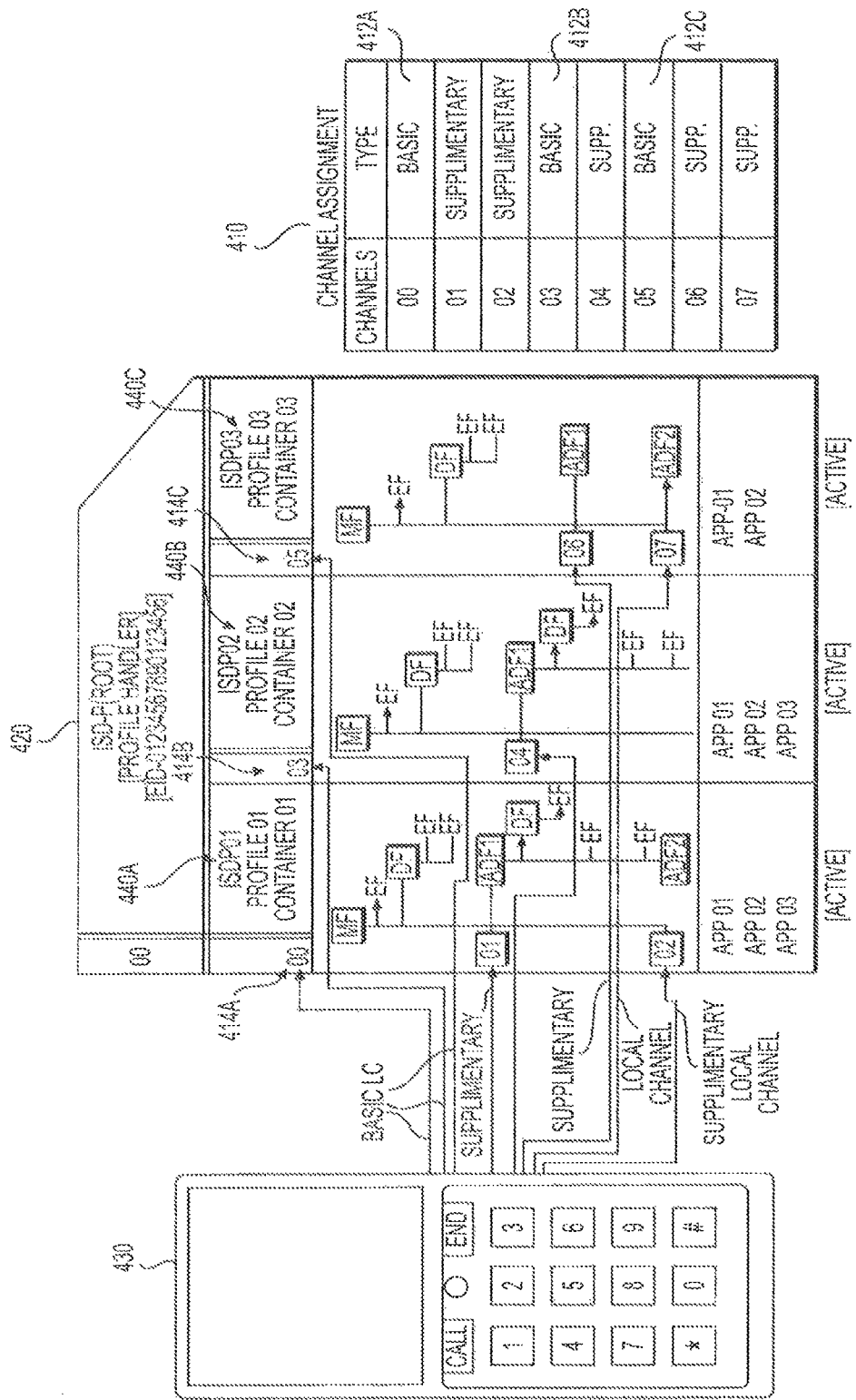
FIG. 4 illustrates a high level block diagram of a system for managing multiple active subscriber identity module profiles, including a basic logical channel assignment table, in accordance with a particular non-limiting embodiment of the present disclosure.

With reference to FIG. 4, a block diagram is illustrated in accordance with a non-limiting embodiment of a system for managing multiple active SIM profiles. Channel assignment table 410 includes channel assignments for transmitting and receiving operations between device 430 and SIM 420 and/or a carrier server and SIM 420, though the carrier signals may first be received by device antennae. Basic logical channel assignments 412a-c correspond to basic logical channels 414a-c that link to each active profile 440a-c on SIM 420. Toolkit operations and command APDU's can be accommodated on each basic logical channel 414a-c without departing from industry standard specifications requiring a basic logical channel for such operations.

Figure 5:
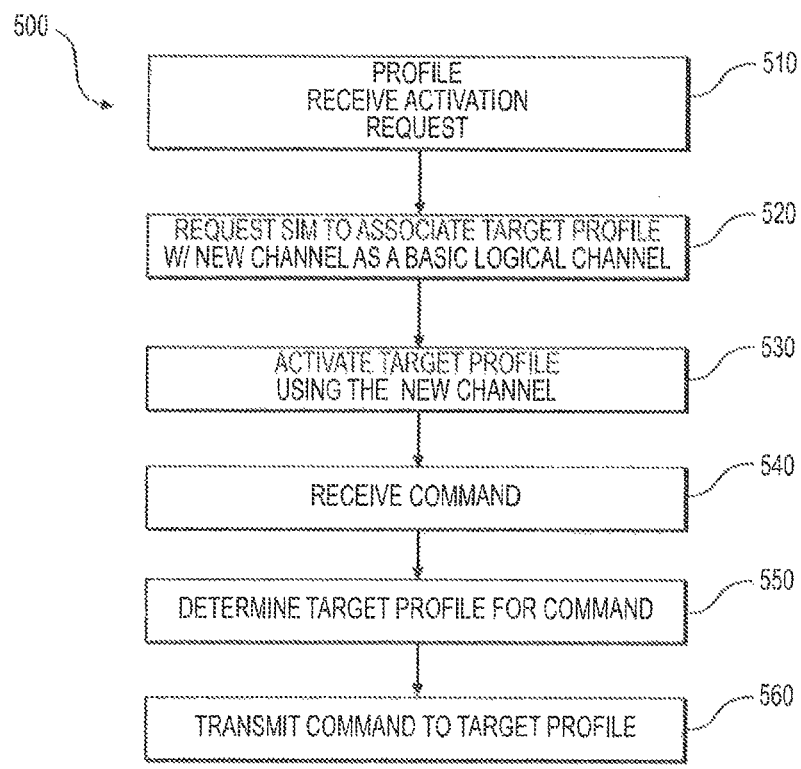
FIG. 5 illustrates a flow chart of a method for managing multiple active subscriber identity module profiles in accordance with a particular non-limiting embodiment of the present disclosure.

With reference to FIG. 5, a flow chart of a method for managing multiple active SIM profiles is illustrated in accordance with a non-limiting embodiment of the present disclosure. At step 510, a SIM profile activation request is received at the device. In one example, a particular application requests a dedicated SIM profile handler to active a particular profile. As another example, a carrier requests such an activation with a command issued from the carrier's server.

At step 520, the device requests the SIM to associated a target active profile with a new channel as a basic logical channel. In particular embodiments, this is a multi-step process that includes several commands and responses. For example, a select profile command is issued, followed by a manage channel command to assign a basic logical channel to the profile.

At step 530, the target profile is activated using the new basic logical channel and commands can be received by the target profile. At step 540, a command is received by the handler process. For example, the command is a toolkit command that specifies a profile container by including a profile container identifier. In particular embodiments, the command also has an application identifier. The application identifier corresponds to several active applications on several active profiles. For example, in FIG. 4, the application identifier could correspond to App01, which is running on each of active profiles 440a-c.

Returning to FIG. 5, at step 550, the handler process determines to which profile and corresponding channel the command is routed. For example, this is determined based on the profile container identifier included in the command request. At step 560, the handler process transmits the command to the specified profile using the corresponding basic logical channel for that profile. The handler can also receive responses, such as response APDU's or responses to toolkit operations and transmit them to the relevant processes if necessary.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Any combination of one or more computer-readable media may be utilized to store computer-readable instructions described herein. The computer-readable media may be a computer-readable signal medium or a computer-readable storage medium, for example. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, a subscriber identity module (SIM) card or other universal integrated circuit card (UICC or eUICC), memory integrated with or separate from the wireless device, or any suitable combination of the foregoing or other data carriers. In the context of this document, a computer-readable storage medium may be any tangible medium that can contain, or store a program for use by or in connection with an instruction execution system, apparatus, or device.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations or block diagrams, may be implemented by computer program instructions, for example. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the function(s) specified in the flowcharts or block diagram block(s).

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function(s) specified in the flowchart or block diagram block(s). The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the function(s) specified in the flowcharts or block diagram block(s). For example, wireless devices described herein are examples of such programmable data processing apparatuses.

Aspects of the present disclosure may be implemented by various combinations of apparatuses, devices, systems, or components thereof, for example. Reference in the appended claims to an apparatus, device, or system or a component thereof being configured to or operable to perform a particular function encompasses that apparatus, system, component, or device, whether such apparatus, system, component, or device or such particular function is activated, turned on, or unlocked, as long as that apparatus, system, or component is so configured or operable.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A method for a host device managing multiple profiles stored on a single subscriber identity module card, the method comprising:
    sending a request to activate an additional profile stored on the same single subscriber identity module card that comprises an active profile associated with a first basic logical channel in communication with the host device upon startup, wherein the additional profile is in an inactive state prior to sending the request for activating the additional profile to the single subscriber identity module card over the first basic logical channel;
    requesting, using the first basic logical channel, the single subscriber identity module card to associate the additional profile with a second basic logical channel for communicating with the host device; and
    transmitting a command from the host device to the additional profile using the second basic logical channel while the active profile associated with the first basic logical channel is in an active state such that each of the active profile and the additional profile on the same single subscriber identity module card are in the active state simultaneously,
    wherein the host device communicates directly with the active profile via the first basic logical channel and the host device communicates directly with the additional profile via the second basic logical channel when each of the active profile and the additional profile are in the active state simultaneously.

2. The method of claim 1, wherein the command comprises:
    an application identifier corresponding to a plurality of applications, each application running in a respective profile container of a plurality of profile containers for each of the active profile and the additional profile.

3. The method of claim 2, wherein the command further comprises:
    a profile identifier corresponding to the additional profile, and wherein transmitting the command to the additional profile further comprises transmitting the command from the host device to the corresponding application in the respective profile container for the additional profile over the second basic logical channel based on the profile identifier and the application identifier.

4. The method of claim 1, wherein the single subscriber identity module card is embedded in the host device, which is a mobile device.

5. The method of claim 1, wherein the active profile is associated with a first network service subscription and wherein the additional profile is associated with a second network service subscription, different from the first, such that each of the first network service subscription and the second network service subscription are simultaneously active on the host device.

6. The method of claim 5, wherein the first network service subscription is associated with a data subscription from a first carrier for use with a voice application, and wherein the second network service subscription is associated with a voice subscription from a second carrier for use with a data application.

7. The method of claim 6, further comprising:
    receiving a request to transmit data using a data network;
    determining whether to use the active profile or the additional profile to complete the request based on a type of network required to transmit the data; and
    transmitting a second command from the host device to the additional profile over the second logical channel, the second command configured to use the additional profile to transmit the data.

8. A mobile communication device configured to access multiple profiles stored on a single subscriber identity module card, the mobile communication device comprising:
    at least one processor; and
    a non-transitory, computer-readable storage medium storing computer-readable instructions that when executed by the at least one processor cause the mobile communication device to perform processes, comprising:

sending a request to activate an additional profile stored on the same single subscriber identity module card that comprises an active profile associated with a first basic logical channel in communication with the mobile communication device, wherein the additional profile is in an inactive state prior to sending the request for activating the additional profile to the single subscriber identity module card over the first basic logical channel;

requesting, using the first basic logical channel, the single subscriber identity module card to associate the additional profile with a second basic logical channel for communicating with the mobile communication device; and transmitting a command from the mobile communication device to the additional profile using the second basic logical channel while the active profile associated with the first basic logical channel is in an active state such that each of the active profile and the additional profile on the same single subscriber identity module card are in the active state simultaneously, wherein the mobile communication device is configured to communicate directly with the active profile via the first basic logical channel and the mobile communications device is configured to communicate directly with the additional profile via the second basic logical channel when each of the active profile and the additional profile are in the active state simultaneously.

9. The mobile communication device of claim 8, wherein the command comprises:

an application identifier corresponding to a plurality of applications, each application running in a respective profile container of a plurality of profile containers for each of the active profile and the additional profile.

10. The mobile communication device of claim 9, wherein the command further comprises:

a profile identifier corresponding to the additional profile, and wherein transmitting the command to the additional profile further comprises transmitting the command from the mobile communication device to the corresponding application in the respective profile container for the additional profile over the second basic logical channel based on the profile identifier and the application identifier.

11. The mobile communication device of claim 10, wherein the processor is further configured to perform the process of:

the mobile communications device receiving an acknowledgment over the first basic logical channel that the additional profile was activated.

12. The mobile communication device of claim 8, wherein the single subscriber identity module card is embedded in the mobile communication device.

13. The mobile communication device of claim 8, wherein the active profile is associated with a first network service subscription and wherein the additional profile is associated with a second network service subscription, different from the first, such that each of the first network service subscription and the second network service subscription are simultaneously active on the mobile communication device.

14. The mobile communication device of claim 13, wherein the first network service subscription is associated with a data subscription from a first carrier for use with a voice application, and wherein the second network service subscription is associated with a voice subscription from a second carrier for use with a data application.

15. The mobile communication device of claim 14, further comprising:

receiving a request to transmit data using a data network;

determining whether to use the active profile or the additional profile to complete the request based on a type of network required to transmit the data; and transmitting a second command from the mobile communications device to the additional profile over the second logical channel, the second command configured to use the additional profile to transmit the data.

16. A computer program product comprising:

a non-transitory computer-readable storage medium having computer-readable program code embodied therewith, the computer-readable program code comprising:

computer-readable program code configured to send a request to activate an additional profile stored on a same single subscriber identity module card that comprises an active profile associated with a first basic logical channel for communication with a host device, wherein the additional profile is in an inactive state prior to sending the request for activating the additional profile to the single subscriber identity module card over the first basic logical channel;

computer-readable program code configured to request, using the first basic logical channel, the single subscriber identity module card to associate the additional profile with a second basic logical channel for communicating with the host device; and computer-readable program code configured to transmit a command from the host device to the additional profile using the second basic logical channel while the active profile associated with the first basic logical channel is in an active state such that each of the active profile and the additional profile on the same single subscriber identity module card are in the active state simultaneously, wherein the host device is configured to communicate directly with the active profile via the first basic logical channel and the host device is configured to communicate directly with the additional profile via the second basic logical channel when each of the active profile and the additional profile are in the active state simultaneously.

17. The computer program product of claim 16, wherein the command comprises:

an application identifier corresponding to a plurality of applications, each application running in a respective profile container of a plurality of profile containers for each of the active profile and the additional profile.

18. The computer program product of claim 17, wherein the command further comprises:

a profile identifier corresponding to the additional profile, and wherein transmitting the command to the additional profile further comprises transmitting the command from the host device to the corresponding application in the respective profile container for the additional profile over the second basic logical channel based on the profile identifier and the application identifier.

19. The method of claim 1, further comprising:

the host device receiving an acknowledgment over the first basic logical channel that the additional profile was activated.

* * * * *